United States Patent [19]
Gupta

[11] Patent Number: 5,120,793
[45] Date of Patent: Jun. 9, 1992

[54] PROCESS FOR PREPARING ETHER DERIVATIVES OF POLYMERS OF P-HYDROXYSTYRENE

[75] Inventor: Balaram Gupta, Somerset City, N.J.

[73] Assignee: Hoechst Celanese Corp., Somerville, N.J.

[21] Appl. No.: 510,485

[22] Filed: Apr. 18, 1990

[51] Int. Cl.$^5$ .............................................. C08F 8/34
[52] U.S. Cl. .................................. 525/242; 525/301; 525/308; 525/309
[58] Field of Search ............... 525/242, 301, 308, 309

[56] References Cited

U.S. PATENT DOCUMENTS 4,128,706 12/1978 Seita et al. ........................... 525/242
4,886,858 12/1989 Katagiri et al. ..................... 525/301

*Primary Examiner*—Bernard Lipman
*Attorney, Agent, or Firm*—P. S. Kalyanaraman

[57] ABSTRACT

Ether derivatives of polymers of p-hydroxystyrene are made by reacting the polymer through Michael addition with an ethylenically unsaturated compound which contains an electron withdrawing group on the carbon atom alpha to the unsaturation.

3 Claims, No Drawings

PROCESS FOR PREPARING ETHER DERIVATIVES OF POLYMERS OF P-HYDROXYSTYRENE

BACKGROUND OF THE INVENTION

The field of art to which this invention is directed is derivatives of polymers of p-hydroxystyrene.

Homopolymers and copolymers of p-hydroxystyrene are well known compositions which are described in such patents as U.S. Pat. No. 4,689,371 and U.S. Pat. No. 4,775,730. These polymers have been used in a number of applications, such as the metal treatment described in U.S. Pat. Nos. 4,376,000 and 4,433,015, and as the epoxy resin curing agents described in U.S. Pat. No. 3,884,992. Such polymers have also been used in photoresist compositions as disclosed in U.S. Pat. No. 4,869,994.

Poly(p-hydroxystyrene) has been derivatized with a number of reagents to form useful compositions. An example of a derivatizing reaction is found in U.S. Pat. No. 4,390,664 wherein epichlorohydrin is reacted with poly(hydroxystyrene) to form polyepoxide compositions. Polymers containing silicon-functional groups made by reacting poly(hydroxystyrene) with chloromethylsilanes are described in the European Polymer Journal 11(9), 653-5.

SUMMARY OF THE INVENTION

This invention is directed to derivatives of polymers of p-hydroxystyrene. In one aspect, this invention pertains to ether derivatives of polymers of p-hydroxystyrene. In another aspect, this invention relates to the process for preparing such ether derivatives.

The compositions of this invention are ether derivatives of p-hydroxystyrene containing the moiety

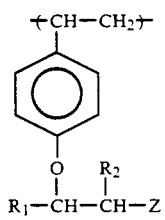

wherein Z is an electron withdrawing group and $R_1$ is hydrogen, an alkyl group, or an aromatic group and $R_2$ is hydrogen or an alkyl group. The electron withdrawing group can be a carbonyl group, a nitrile group, a nitro group, or a sulfone group.

By the process of this invention, ether derivatives of p-hydroxystyrene are prepared by the Michael addition of the phenolic hydroxyls of the polymers to the carbon-carbon double bond of compounds containing electron withdrawing groups on the carbon atoms alpha to the carbon-carbon double bonds.

The derivatized polymers made by the process of this invention are useful, for example, as plasticizers for polymers in film-forming compositions, as ion-exchange resins, and the like.

DESCRIPTION OF THE INVENTION

Para-hydroxystyrene homopolymers and copolymers useful in this invention can be made by the free radical polymerization of p-hydroxystyrene with or without comonomers. Preferably, the p-hydroxystyrene polymers are made by hydrolyzing the acetoxy groups of polymers of p-acetoxystyrene using such procedure as are described in U.S. Pat. Nos. 4,678,843; 4,689,371; 4,822,862 and 4,857,601, which are hereby incorporated by reference.

In carrying out the process of this invention, homopolymers and copolymers of p-hydroxystyrene can be used. The copolymers can be made using any monomer which is copolymerizable with p-hydroxystyrene provided the monomers contain no groups which would interfere with the Michael addition reaction. Examples of useful comonomers are styrene, vinyl toluene, alpha-methyl styrene, acrylic and methacrylic ester monomers wherein the ester group contains from 1 to 24 carbon atoms, acrylic acid, methacrylic acid, maleic acid, fumaric acid, and diene monomers, such as butadiene, isoprene, dialkyl muconate and the like. Useful comonomers are described in U.S. Pat. Nos. 4,689,371 and 4,775,730, which are hereby incorporated by reference.

The p-hydroxystyrene polymers useful in this invention contain at least about 5 weight percent p-hydroxystyrene, preferably about 10 to 100 weight percent.

The compounds which are reacted with the phenolic hydroxyl groups of the p-hydroxystyrene polymers are ethylenically unsaturated compounds which contain electron withdrawing groups on the carbon atoms alpha to the carbon-carbon double bonds. Such compounds can be represented by the formula:

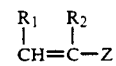

wherein Z is the electron withdrawing group, and $R_1$ is hydrogen, an alkyl group, or an aromatic group and $R_2$ is hydrogen or an alkyl group.

As set forth in "Organic Reactions" Volume X, Krueger Publishing Company, Huntington, N.Y. 1975 on page 182, the Michael condensation in its original scope involved the addition of a donor containing an active hydrogen atom to a carbon-carbon double bond that formed part of a conjugated system of the general formula, C=C—C=O, in an acceptor. Typical acceptors were alpha-beta unsaturated aldehydes, ketones and acid derivatives. The Michael addition reaction has now come to be understood to include, acceptors activated by groups other than carbonyl and carbalkoxyl, e.g., nitrile, nitro and sulfone groups.

Examples of useful unsaturated compounds are acrylonitrile, methacrylonitrile, crotonitrile, acrylic acid, methacrylic acid, alkyl acrylates and methacrylates wherein the alkyl group contains from 1 to 24 carbon atoms, acrylamide, methacrylamide, acrolein, crotonaldehyde, cinnamaldehyde, methyl vinyl ketone, ethyl vinyl ketone, mesityl oxide, vinylphenyl ketone, nitropropene, methylvinyl sulfone, divinyl sulfone and the like. Numerous useful unsaturated compounds are described in "Organic Reactions" referred to hereinabove, Tables 1 to XXI, which is hereby incorporated by reference.

As set forth hereinabove, useful unsaturated compounds can be represented by the formula

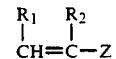

wherein Z is the electron withdrawing group and $R_1$ is hydrogen, an alkyl group, or an aromatic group and $R_2$ is hydrogen or an alkyl group. Examples of electron withdrawing groups include such groups as nitrile groups, carbonyl groups, nitro groups and sulfone groups. Carbonyl groups include aldehyde groups, ketone groups, carboxylic acid groups, amide groups, and ester groups, e.g.,

wherein $R_3$ is an alkyl group containing 1 to 24 carbon atoms. $R_1$ and $R_2$ can be hydrogen, methyl groups or phenyl groups. Preferably, Z is a nitrile group, a carboxylic acid group, or an ester group wherein $R_3$ is an alkyl group containing 1 to 4 carbon atoms. Preferably, $R_1$ and $R_2$ are hydrogen.

Other useful unsaturated compounds, not exactly exemplified by the formula are divinyl sulfone, divinyl ketone, maleic acid and half and full esters of maleic acid wherein the ester groups contain 1 to 4 carbon atoms.

When conducting the Michael addition reaction, the unsaturated compound and the poly(hydroxystyrene) are reacted in the ratio of about 0.1 to about 1 equivalent of the unsaturated compound to 1 equivalent of the phenolic groups of the poly(hydroxystyrene). If all of the phenolic hydroxyl groups are to be reacted, then an excess of the unsaturated compound is used.

The reaction is conducted in an organic solvent in which both the poly(hydroxystyrene) and the acceptor compound are soluble. Examples of such solvents are N,N-dimethyl formamide t-butanol, isopropanol, and N-methylpyrrolidone. A preferred solvent is N-methylpyrrolidone. It shall be noted that a solvent which can react with the acceptor compound should not be used in this process.

The Michael addition reaction is a base catalyzed reaction, such bases being alkali metal hydroxides, alkali metal carbonates, alkali metal alkoxides, alkali metal hydrides, tertiary amines, quaternary bases, and the like. However, in the process of this invention only the alkali metal hydrides has been found to be effective. Lithium hydride is the preferred catalyst.

The amount of catalyst used is about 0.5 to about 5 weight percent based on the weight of the polyhydroxystyrene and the unsaturated compound. Preferably, the amount is about 1 to about 2 weight percent.

The polymer of p-hydroxystyrene and the unsaturated compound are reacted at room temperature up to the reflux temperature of the solvent, i.e., up to about 200° C. Preferably, the reaction is conducted at about 80° C. to about 200° C. for a time sufficient to complete reaction, generally about 15 minutes to about 24 hours.

The derivatized hydroxystyrene polymers of this invention can be used in numerous applications depending on the nature of the electron withdrawing group of the acceptor. In most instances, the adducts are useful as plasticizers or modifiers for engineering resins. Adducts made from acrylic esters are particularly useful as modifiers for polyesters. Adducts made with acrylamide find use as modifiers for nylon resins. Adducts made with acrylic acid, salted with a base or unsalted, are useful as modifiers for ionomers.

Adducts made with acrylonitrile can be used as resin modifiers, or the nitrile group can be hydrolyzed to a carboxylic acid group. Adducts which contain carboxylic acid groups, obtained through hydrolysis of nitrile groups, through saponification of acrylic ester groups or through adduction with acrylic acid, can be used, for example, in ion-exchange reactions, as curing agents for epoxy resins, and to form thermoset resins through crosslinking with aminoplast and phenolplast resins.

The adducts can be used in photoresist application utilizing the reverse or retro-Michael reaction. The adduct, e.g., derivative of poly(hydroxystyrene) and acrylonitrile, is mixed with a suitable catalyst, formed into a film, masked, and exposed to ultraviolet light. Under the influence of the light activated catalyst, the adduct reverts to the phenolic compound and the unsaturated compound. The phenolic compound can then be developed with alkali or with an organic solvent. Suitable light activated catalysts are such compounds as $ArN_2^{\oplus}MX^{\ominus}$, $Ar_2I^{\oplus}MX_n^{\ominus}$, and $Ar_2S^+MX_n^{\ominus}$, wherein $MX_n^{\ominus} = BF_4^{\ominus}$, $PF_6^{\ominus}$, $AsF_6^{\ominus}$, $SbF_6^{\ominus}$, etc.

The following examples describe the invention in more detail. Parts and percentages are by weight unless otherwise indicated.

EXAMPLE 1

To a suitable reactor are added 3 parts of poly(parahydroxystyrene) and 20 parts by volume of N-methyl pyrrolidone. When solution is obtained, a dispersion of 0.24 part of lithium hydride in 5 parts by volume of N-methylpyrrolidone is added under a nitrogen atmosphere. After one hour, 10.6 parts of acrylonitrile are added. Heat is applied raising the temperature to reflux-200° C. After 15 minutes at this temperature, the reactants are cooled and filtered. The filtrate is dropped into 1000 parts of water which contains 5 parts by volume of concentrated hydrochloric acid. The precipitated solids are removed from the water by filtration and are washed with water. After drying in a vacuum oven at 50° C., the polymer is recovered in 63.9 percent yield. The product is cyanoethylated poly(parahydroxystyrene) as shown by infra-red analysis and nuclear magnetic resonance analysis.

EXAMPLE 2

The procedure of Example 1 is repeated except for the solvent. Instead of using N-methylpyrrolidone, t-butanol is used as the solvent. The reaction is carried out for a period of about 18 hours at reflux temperature (83° C.) of the solvent. The product in 87 percent yield is cyanoethylated poly(parahydroxystyrene) as shown by infrared and nuclear magnetic resonance analyses.

EXAMPLE 3

The procedure of Example 1 is repeated except as noted. Acrylic acid in 14.4 parts is used as the ethylenically unsaturated compound in this example. The reaction is carried out for a period of about 18 hours. The resulting product in almost 100% yield is shown to be caboxyethylated poly(parahydroxystyrene) by infrared and nuclear magnetic resonance analyses.

EXAMPLE 4

The Example 3 is repeated. The reaction is carried out for a period of about 18 hours. The resulting product in almost 100 percent yield is shown to be caboxyethylated poly(parahydroxystyrene) by infrared and nuclear magnetic resonance analyses.

EXAMPLE 5

The procedure of Example 1 is repeated except as noted. Dimethyl maleate in 7.2 parts is used as the ethylenically unsaturated compound in this example. The reaction is carried out for a period of about 18 hours. The resulting product in 43.3 percent yield is shown to be an adduct of dimethyl maleate and poly(parahydroxystyrene) by infrared and nuclear magnetic resonance analyses.

EXAMPLE 6

The procedure of Example 1 is repeated except as noted. Methyl methacrylate in 5 parts is used as the ethylenically unsaturated compound in this example. The reaction is carried out for a period of about 20 minutes. The resulting product in 40.5 percent yield is shown to be an adduct of methyl methacrylate and poly(parahydroxystyrene) by infrared and nuclear magnetic resonance analyses.

EXAMPLE 7

The Example 6 is repeated. The reaction is carried out for a period of about 3 hours. The resulting product in 60.5 percent yield is shown to be an adduct of methyl methacrylate and poly(parahydroxystyrene) by infrared and nuclear magnetic resonance analyses.

EXAMPLE 8

The procedure of Example 1 is repeated except as noted. Ethyl acrylate in 5 parts is used as the ethylenically unsaturated compound in this example and the reaction is carried out for a period of about 18 hours. The resulting product in almost 71.3 percent yield is shown to be an adduct of ethyl acrylate and poly(-parahydroxystyrene) by infrared and nuclear magnetic resonance analyses. .

EXAMPLE 9

The procedure of Example 8 is repeated except t-butanol is used as solvent instead of N-methylpyrrolidone. The reaction is carried out for 2½ hours. The resulting product in 26.2 percent yield is shown to be an adduct of ethyl acrylate and poly(parahydroxystyrene) by infrared and nuclear magnetic resonance analyses.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A polymer comprising an ether derivative of poly(-parahydroxystyrene) containing the structure:

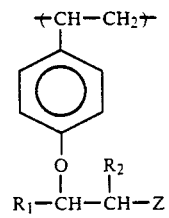

wherein $R_1$ is hydrogen, an alkyl group or an aromatic group, $R_2$ is hydrogen or an alkyl group and Z is an electron withdrawing group.

2. The polymer of claim 1 wherein Z is a carbonyl group, a nitrile group, a nitro group, or a sulfone group.

3. The polymer of claim 1 wherein $R_1$ and $R_2$ are hydrogen.

* * * * *